United States Patent [19]

Ashfield et al.

[11] Patent Number: 5,347,633
[45] Date of Patent: Sep. 13, 1994

[54] SYSTEM FOR SELECTIVELY INTERCEPTING AND REROUTING DATA NETWORK TRAFFIC

[75] Inventors: James C. Ashfield, Raleigh; Gregory D. Baker, Apex; Robert C. Nevins; Jeffrey A. Raynes, both of Raleigh; Aaron T. Sultan, Carrboro; Joseph K. Parks, Durham; Michael D. Rhodin; Reid L. Sayre, both of Raleigh, all of N.C.

[73] Assignee: International Business Machines, Inc., Armonk, N.Y.

[21] Appl. No.: 693,836

[22] Filed: Apr. 30, 1991

[51] Int. Cl.$^5$ .............. G06F 13/00; G06F 15/16
[52] U.S. Cl. .............. 395/200; 395/800; 364/DIG. 1; 364/229.4; 364/242.94; 364/284; 364/284.3; 364/284.4
[58] Field of Search .............. 395/200, 800

[56] References Cited

U.S. PATENT DOCUMENTS

| | | | |
|---|---|---|---|
| 4,875,208 | 10/1989 | Furuhashi et al. | 370/94.1 |
| 5,109,486 | 4/1992 | Seymour | 395/200 |
| 5,133,053 | 7/1992 | Johnson et al. | 395/200 |
| 5,210,748 | 5/1993 | Onishi et al. | 370/85.13 |

OTHER PUBLICATIONS

IEEE Communications Magazine, vol. 26, No. 7, Jul. 1988, New York, N.Y., US pp. 8-17 W. S. Lai: "Packet Forwarding".

Computer Networking Symposium, Nov. 1986, Washington, D.C., US, pp. 189-195 P. A. Ligomenides et al.: "Local Rerouting in Computer Communication Networks".

Primary Examiner—Parshotam S. Lall
Assistant Examiner—Ayni Mohamed
Attorney, Agent, or Firm—Gerald R. Woods

[57] ABSTRACT

An enhanced intervention list is used in a data communication network used to route messages from a source or originating user to a destination user in the network. The enhanced intervention list includes an intervention type field which defines how an intercepted distribution is to be processed. For an Associative Redirection intervention type, the message is redirected to a destination user identified in the intervention list. For a Predirecting Intervention type, the message is diverted to an intervening agent or program identified in the intervention list. After the message is processed by the intervening agent, it is routed to a user directory which identifies the destination node serving the destination user. For a Postdirecting Intervention type, the message is sent to the local user directory first and is then checked against the intervention list entries to see if intervention is still warranted. The enhancements to the intervention list provide greater flexibility in handling of intercepted messages.

5 Claims, 9 Drawing Sheets

| USER DIRECTORY | |
|---|---|
| DEST DUN | DEST DUN |
| MFG.CHILD | LOCAL |
| MKT.NEFF | US.NYCSYS1 |
| MKTT.PIAF | EUR.PARSYS1 |
| PER.CHASE | LOCAL |

| ROUTING TABLE | |
|---|---|
| DESTINATION DSUN | CONNECTION NEXT DSUN |
| EUR.PARSYS1 | US.NYCSYS1 |
| US.NYCSYS1 | US.NYCSYS1 |

123

| USER DIRECTORY | |
|---|---|
| DEST DUN | DEST DUN |
| MFG.CHILD | US.CHISYS2 |
| MKT.NEFF | LOCAL |
| MKTT.PIAF | EUR.PARSYS1 |
| PER.CHASE | US.CHISYS2 |

| ROUTING TABLE | |
|---|---|
| DESTINATION DSUN | CONNECTION NEXT DSUN |
| EUR.PARSYS1 | EUR.PARSYS1 |
| US.NYCSYS1 | US.CHISYS2 |

124

| USER DIRECTORY | |
|---|---|
| DEST DUN | DEST DUN |
| MFG.CHILD | US.CHISYS2 |
| MKT.NEFF | US.NYCSYS1 |
| MKTT.PIAF | LOCAL |
| PER.CHASE | US.CHISYS2 |

| ROUTING TABLE | |
|---|---|
| DESTINATION DSUN | CONNECTION NEXT DSUN |
| EUR.PARSYS1 | US.NYCSYS1 |
| US.NYCSYS1 | US.NYCSYS1 |

| DSU NAME | AGENT NAME | INTERVENTION TYPE | INTERVENING AGENT |
|---|---|---|---|
| US.CHISYS1 | AGENT_X | ASSOCIATIVE REDIRECTION | ——— |
| US.CHISYS2 | * | ASSOCIATIVE REDIRECTION | ——— |
| US.CHISYS1 | AGENT_A | PREDIRECTING INTERVENTION | IAGENT_AX |
| US.CHISYS1 | AGENT_A | PREDIRECTING INTERVENTION | IAGENT_AX |
| CA.* | AGENT_B | POSTDIRECT. INTERVENTION | IAGENT_B2Y |
| EUR.* | AGENT_B | POSTDIRECT. INTERVENTION | IAGENT_B2Y |

SYSTEM FOR SELECTIVELY INTERCEPTING AND REROUTING DATA NETWORK TRAFFIC

FIELD OF THE INVENTION

The present invention relates to a network for distributing data and more particularly to a system for selectively intercepting and rerouting messages being distributed through the network.

BACKGROUND OF THE INVENTION

A data communications network can be viewed as a collection of nodes which are interconnected through communications links. Nodes can be characterized as either end nodes or network nodes. A network node is a data processing system that provides certain functions within the network, such as transferring of messages between itself and its adjacent or neighboring nodes, selection of routes for messages to be transmitted to a distant end node and the furnishing of directory services to end nodes. End nodes are also data processing systems that typically provide fewer functions than network nodes while providing an interface between users and the remainder of the network. The links between nodes may be permanent links, such as owned or leased lines, or temporary links that are enabled only when needed. An example of a temporary link is a dial-up telephone connection made through a public or private telephone network.

A primary function of any data communications network is to allow messages to be distributed between different users of the network. A first or originating user wishing to send a message to a second or destination user must, of course, identify the destination user to the system and must include the user identification in control information which accompanies the message. The combination of the message, accompanying control information and any delimiters (prefixes and suffixes) is sometimes referred to as a distribution.

In a distribution services network, each user of the network may be identified by a two part user network name. The first part of the user name identifies a group to whom the user belongs. The second part of the user name identifies a single user within that group. Commonly, a user network name is created by concatenating an abbreviation or corruption of the user's department name with an abbreviation or corruption of the user's given name. For example, Kerr Chase in Personnel might be assigned a user name PER.KCHASE.

The group name must be unique within the network. The user identifier must only be unique within each group. For example, it would be permissible to have different people with the same KCHASE user identifier as long they were in different groups.

Network users are served by distribution service units (DSU) identified by a two part, concatenated location or DSU name. The first part of the DSU name identifies the network including the DSU. The second part of the DSU name identifies a particular DSU within that network. For example, a DSU name EUR.PARSYS1 identifies a PARSYS1 DSU in an EUR network. The network identifier must, of course, be unique within a set of interconnected networks. The DSU identifier must only be unique within the specific network in which it is located.

A first network user who wishes to send a message to a second network user does not have to know the name of the DSU which supports the second user; that is, does not actually have to know the physical location of the user. The first user need only know the second user's network name.

To correlate or map user network names to the names of DSU's which serve those users, DSU's include user directories. In its most basic form, a user directory contains the network name of every user served by the interconnected networks. Each name is associated with or mapped to the name of the destination DSU which serves that user. When a message is submitted to the network, the DSU serving the message originator extracts the destination user network name from the message. The user directory is accessed to identify the destination DSU serving the destination user. Both the destination user and the destination DSU serving that user are identified in the control information used to route the message through the networks.

A problem in any network is that the configuration of the network is rarely static. Nodes may be added, removed or merged. Users may move from one node to another either permanently or on a temporary basis. If an originating user cannot be obtain a current, correct network address for an intended destination user, a message sent by the originating user may fail to reach the destination user. The message may be misdelivered, shunted into an electronic limbo or returned to the sender. Any of these occurrences is a nonproductive use of network resources.

To at least partially solve the problem, it is known to use an intervention list at one or more intervening nodes in a network. Each intervention list includes one or more entries, identifying a particular destination DSU. If a message received at the node is found to be addressed to a destination DSU on the intervention list, the intervening DSU extracts the destination user's name from the message and performs a directory lookup to see if a different destination DSU is identified for that destination user. If a different destination DSU has been defined, the message will be redirected to the different DSU.

Intervention lists are used frequently where two old nodes in a network are merged into a single new node. Messages initially addressed to users thought to be at the old node are intercepted at a node on the message path. The intervention list at the intercepting node causes the messages to be redirected to the same users, but at the new node.

Intervention lists are also used where specific users are assigned temporarily to another node. If the assignment is temporary, the intervention list may be used to redirect messages to the user's temporary DSU for the duration of the assignment instead of assigning a new network name to the user. If the assignment is permanent, the intervention list may still be used to redirect messages during an interim period while the user's new network address is being propagated to user directories throughout the system.

Known intervention lists, as described above, can perform only very limited redirection of messages. Messages can be re-directed only on the basis of the destination DSU name. Messages cannot be selectively intercepted based on user (agent) names and cannot be delivered to a user (agent) other than that specified by the originator.

BRIEF SUMMARY OF THE INVENTION

To improve the ability of a node to selectively redirect messages, a new intervention list data structure (and underlying process for using that structure) is provided. The new structure and process allows intermediate nodes on a data path to selectively trap messages as they pass through the node. Intervention may be based on destination application, destination node or a combination thereof. The trapped message can be delivered to a local application program at the intermediate node. The local application program can modify the message and return it to the transport network.

The process is implemented in a data communication system where messages may be transmitted through intermediate nodes between users located at different end nodes. Means are included at one or more of the intermediate nodes for selectively intercepting and redirecting messages. The means comprises means for extracting a target name identifying the destination of the message, means for examining a lookup table for entries related to the target name; and means for redirecting the message either to a node different from the node identified by the target name or to a local application program capable of modifying the message. Message modification performed by the local application program my result in the message being redirected.

BRIEF DESCRIPTION OF THE DRAWINGS

While the specification concludes with claims particularly pointing out and distinctly claiming that which is regarded as the present invention, details of a preferred embodiment of the invention may be more readily ascertained from the following detailed description, when read in conjunction with the accompanying drawings wherein:

FIG. 8 is a tabular representation of an intervention list structured in accordance with the present invention; and FIG. 9, consisting of FIGS. 9A and 9B taken together, are flow charts of a message intervention process using an intervention list data structure of the type illustrated in FIG. 8.

DETAILED DESCRIPTION

Figure 1:
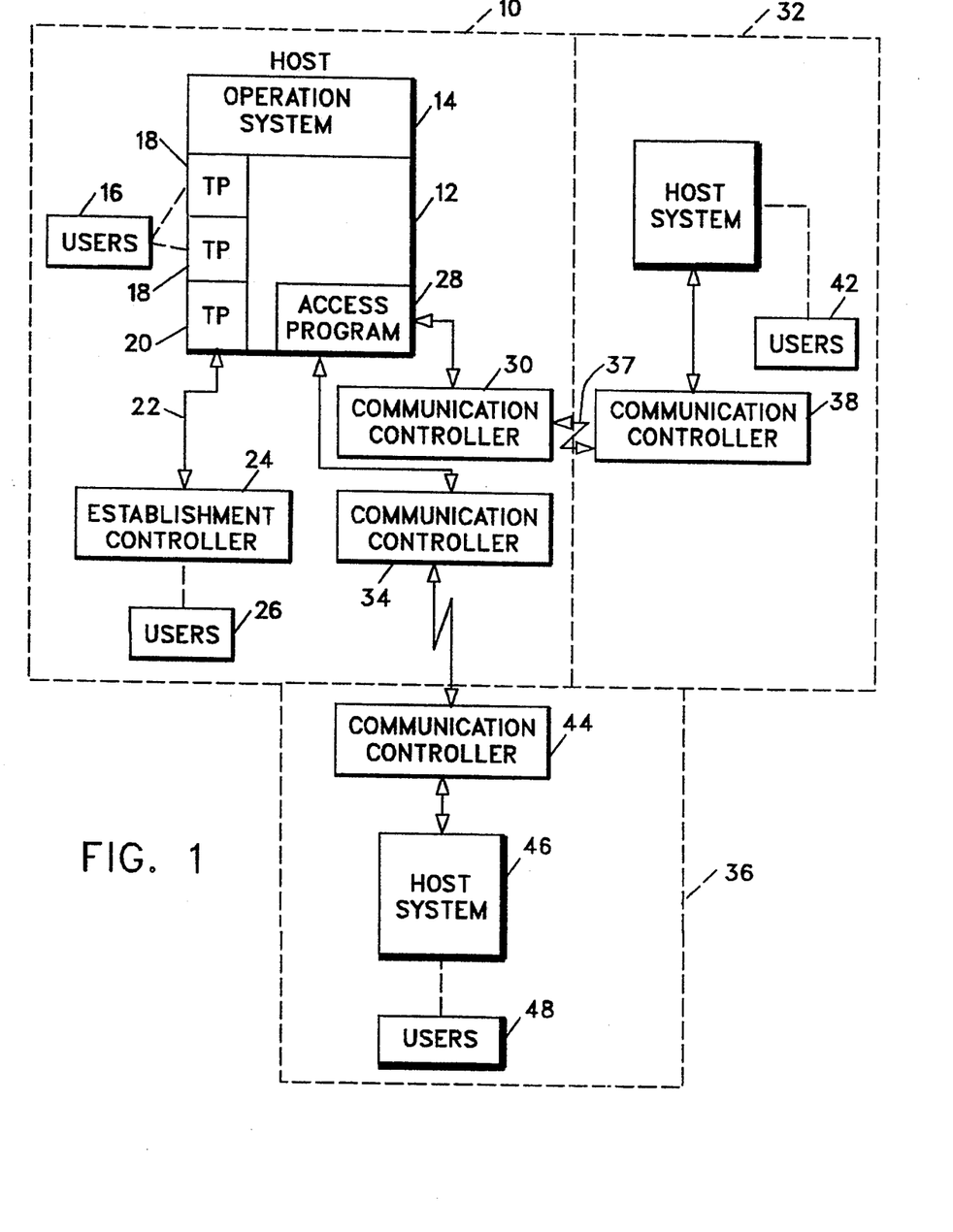
FIG. 1 is a schematic diagram of a communications network in which the present invention may be implemented.

FIG. 1 shows a computer network having three different domains. Domain 10 includes a host processor 12 which operates under the control of an operating system program 14. A plurality of transaction programs may execute in host processor 12. Locally-attached users 16 may interact with the host processor 12 through certain transaction programs 18. Other remotely-connected users 26 may interact with the host processor 12 through an establishment controller 24 which links the users 26 to a transaction program 20 in host 12 over a serial or parallel channel 22.

The host processor 12 can communicate with other hosts using an access program 28, such as a Virtual Telecommunications Access Method (VTAM) program, which supports communications with communication controllers 30 and 34. Communication controller 30 is connected through a telecommunication link 37 to a communication controller 38 in a second domain 32. Second domain 32 includes a host system 40 serving users 42.

Communication controller 34 in domain 10 similarly supports communications with a communications controller 44 in a third domain 36. The third domain 36 has a host system 46 supporting users 48.

There is no significance to the fact that domains 32 and 36 are not described in detail. In practice, these domains would contain the same kinds of equipment and programs as are described with respect to domain 10.

Figure 2:
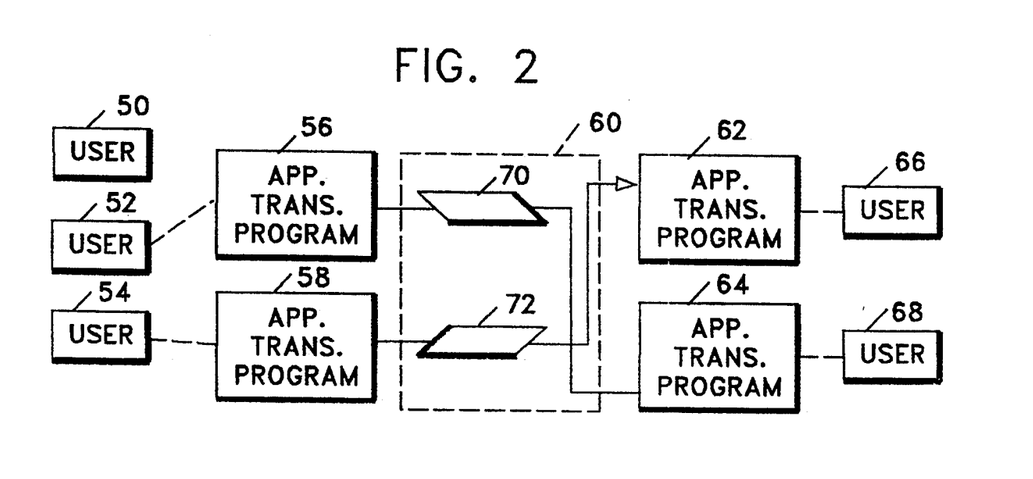
FIG. 2 is high level block diagram of a communications network illustrating a distribution services facility.

FIG. 1 describes a multidomain communication network from the perspective of the equipment and programs that make up tile network. The same network can also be viewed from a more functional standpoint illustrated in FIG. 2. As one of the primary functions of any communications system is to handle the distribution of messages between users, much of the equipment and programs in the network may be placed in a functional group identified as a distribution services network 60. The equipment and programs that fail within group 60 are those that play a role in allowing messages, such as messages 70 and 72, to be distributed between different users (for example, users 52, 54, 66 and 68) that may be located at the same or different nodes in the network. Users interact with the distribution services network through application transaction programs, such as programs 56, 58, 62 and 64. However, neither the users nor the application transaction programs are considered part of the distribution services network.

Figure 3:
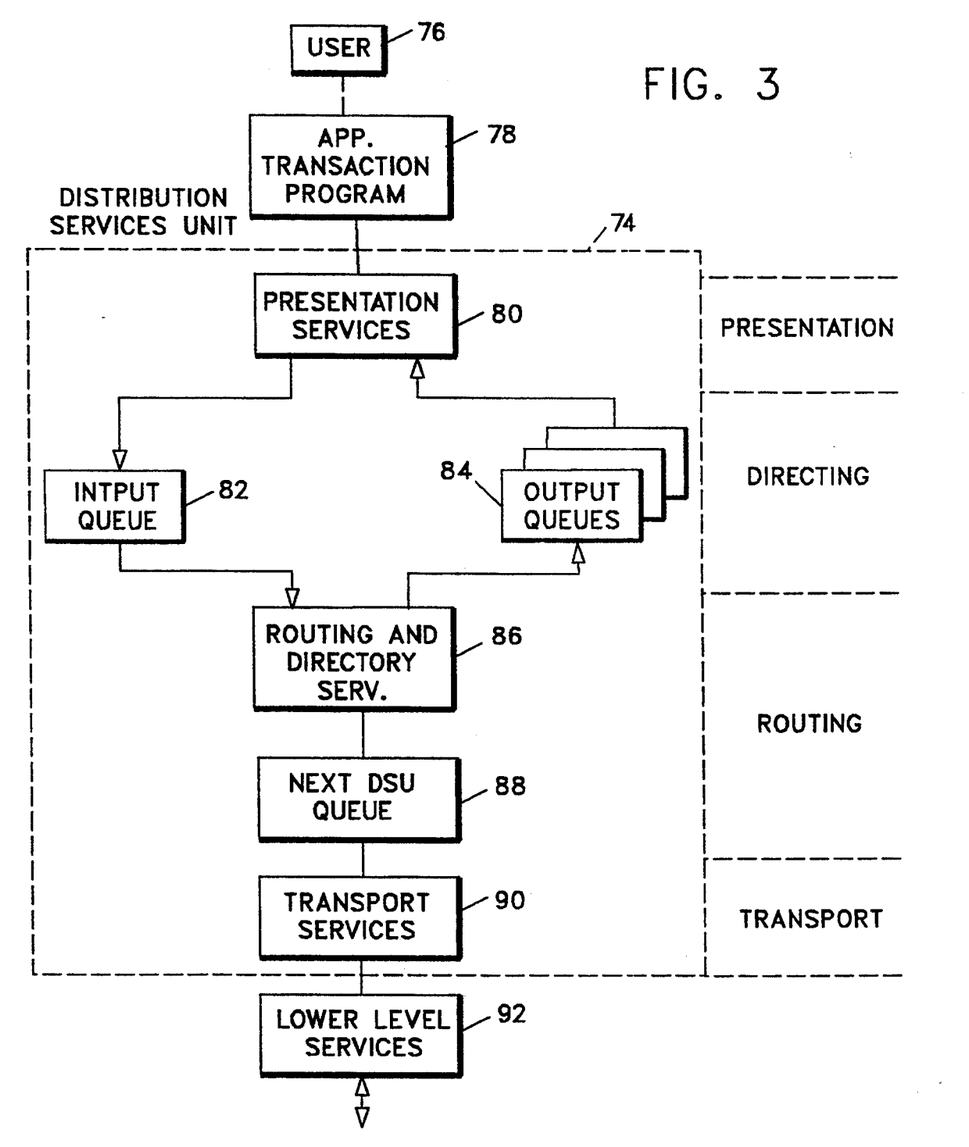
FIG. 3 is a block level presentation of a distribution services unit used at one or more nodes in a communications network.

A distribution services network ordinarily consists of multiple, functionally-defined distribution services units (DSUs), such as unit 74 shown in FIG. 3. Each node in a communication network typically includes a distribution service unit for delivering messages to a user 76 through an application transaction program 78 and for accepting messages originating with the user 76 for distribution to another user located elsewhere in the network.

A distribution services unit includes equipment and programs capable of performing specified distribution functions, which may be viewed as being performed at different layers. At the highest level, presentation services 80 are performed to handle any required character code translations, data conversions, data compression or data expansion.

At the next level, directory services are used to associate destination user names with the locations of those users. Directory services can make use of user directories to identify which output queue in a set 84 should be used in order to deliver a message to an identified user. The set 84 of output queues and an input queue 82 provide an interface between the presentation services functions 80 and a routing and directory services function 86. The content and use of user directories is described in more detail later.

Routing services basically consist of determining the next segment or segments on which a message is to be sent on a path toward a destination and scheduling or queueing that message for transmission. Assuming the message is to be sent to a different distribution services unit, it is transferred to a next DSU queue 88 as a result of routing services.

At the lowest level, a distribution services unit provides transport services 90. Transport services assume the responsibility for forwarding entries in the next DSU queue to the next DSU on the path to the destination user. General network transmission facilities, identified only as lower level services 92, are employed to handle the actual transmission. Lower level services 92 are not, however, considered to be part of the distribution services unit 74.

Computer programs are available today for providing functions of the type described with reference to FIG. 3. One example of such a commercially available computer program is a Systems Network Architecture/Distribution Services program marketed by the International Business Machines Corporation. Although not necessary to an understanding of the present invention, a detailed description of the formats and protocols employed by that program can be found in a *Format and Protocol Reference Manual: Distribution Services* publication (document S C30-3098) available from International Business Machines Corporation.

Figure 4:
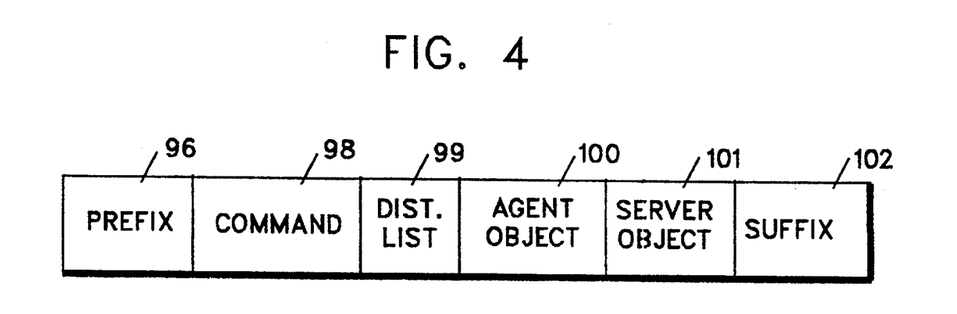
FIG. 4 represents the format of one form of distribution which can be transferred through the network.

That publication contains a detailed description of the format for a distribution that can be handled by the distribution services program. The relevant portions of a distribution are illustrated in FIG. 4. Each distribution consists of a prefix 96, a suffix 102, a command section 98, a distribution list 99, an agent object field 100 and a server object field 101. The prefix 96 and the suffix 102 mark the beginning and end of the distribution 94 to avoid conflicts with other distributions being handled in the system. The command section 98 contains control information used in processing the distribution. The distribution list identifies users to whom the distribution is to be sent.

For a short message, all data to be sent to a user may be included in the agent object field. If a considerable amount of data is to be sent, the server object field may initially include information on where and how the data is to be retrieved from storage for transmission to the destination user. The data itself is retrieved during processing of the distribution and is imbedded within the server object field. For purposes of this description, the combination of the agent object and server object fields can be equated to the actual message to the destination user. The remainder of the distribution may be considered to be control information.

In handling distributions which follow the foregoing Format, a DSU node assigns certain flags which "follow" the distribution during its processing at the node. The flags that are significant to the present invention are:

(1) a LORD (Local Origin Requiring Directing) flag;
(2) a RWROLD (Resubmission With Redirected or Local Destination flag; and
(3) a RWUARD (Resubmission With Unmodified And Remote Destination flag.

The first or LORD flag identifies a distribution which has originated locally and which must be directed toward a distribution services unit serving the destination user. As noted earlier, the directing step involves a user directory. User directories are described in detail later.

The second or RWROLD flag identifies a distribution which originated elsewhere but which has been received and acted upon by a local application transaction program and which must now be directed to a local destination or redirected toward its ultimate destination.

The third or RWUARD flag identifies a distribution which originated elsewhere but which has been received and acted upon by a local application transaction program and which must now be routed to the original, unmodified destination.

The difference between the second and third flags is that the destination of a RWUARD distribution is not changed during local processing while the destination of a RWROLD distribution is changed as a result of local processing.

Figure 5:
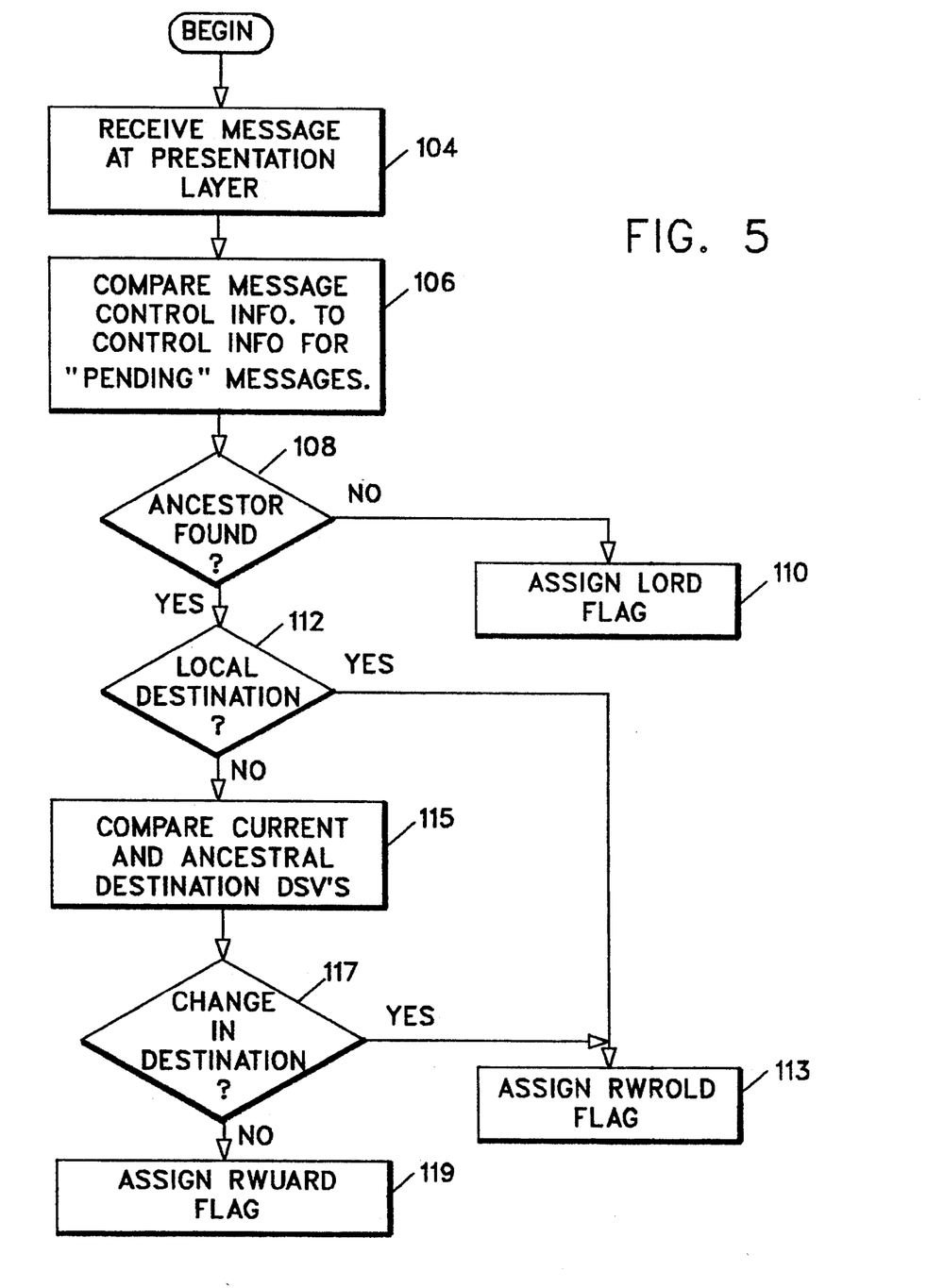
FIG. 5 is a flow chart of a process for assigning certain flags or values used in practicing the present invention.

FIG. 5 is a simplified flow chart of the process by which the various flags are assigned to a distribution during processing. The flag assignment process begins with an operation 104 when a distribution is received at the presentation layer of a DSU. The control information in that distribution is compared in an operation 106 with control information already stored in the DSU for "pending" distributions; that is, distributions that have been received but not yet cleared from the DSU. If an operation 108 fails to find an ancestor for the current message, that failure is interpreted to mean that the distribution originated locally and a LORD flag is assigned in an operation 110.

If, however, an ancestor is found, a second check 112 is made to determine whether the distribution is intended for a local destination. If distribution has a local destination, a RWROLD flag is assigned in an operation 113. A negative response to check 112 means that the distribution has a remote destination. For any such distribution, a comparison 115 is made between the destination DSU information contained in the current distribution and the destination DSU information recorded for the ancestral distribution. If the destination has been changed, the RWROLD flag is assigned in operation 113. If the destination remains unchanged, the RWUARD flag is assigned in an operation 119.

The function of user directories and routing tables in providing message distribution services will be described in the context of a simple, three-node computer network shown at an extremely high level in FIG. 6. The network has three nodes 114, 116 and 118. Node 114 (identified as US.CHISYS2) and node 116 (identified as US.NYCSYS1) are part of the same US network. The third node 118 (EUR.PARSYS1) is part of a different EUR network.

For the sake of simplicity: US.CHISYS2 may be referred to as the Chicago node; US.NYCSYS1 may be referred to as the New York node; and EUR.PARSYS1 may be referred to as the Paris node. In practice, there would probably be multiple nodes in each of those cities and such general references would be inappropriate.

The nodes 114, 116 and 118 contain, respectively, data structures 121, 123 and 124 used in providing directory and routing services. These structures include user directories which provide a correlation between a user's network name and the address of the destination DSU that serves that user. The structures also include routing tables which provide a correlation between a destination DSU and the next DSU to which a distribution should be sent en route to the ultimate destination DSU.

Figure 6:
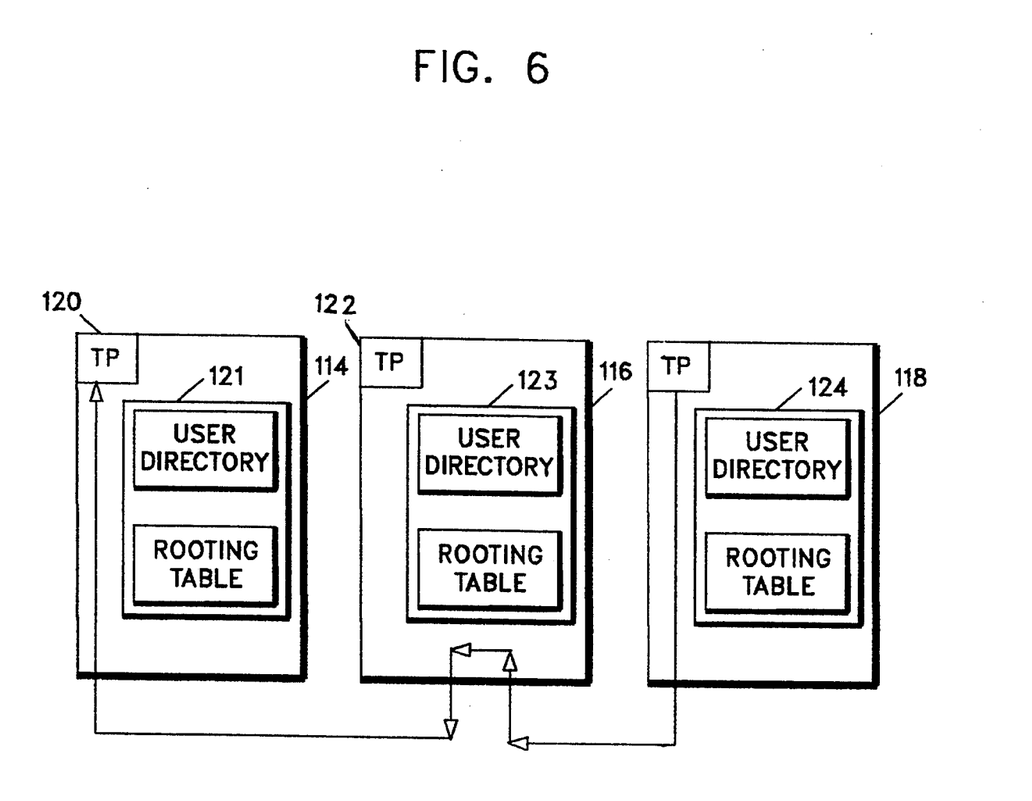
FIG. 6 is a block level diagram of a three-node network suitable for implementing the present invention.

Only four users are identified for the system shown in FIG. 6. Two of those users, Child and Chase, are located at the Chicago node. One, Neff, is located at the New York node. The last, Piaff, is located at the Paris node. As noted earlier, each of these users can be identified to the system by using a two part user network name, consisting of a concatenated group name and individual name.

Network administrators are free to choose the group names within limits set by network architecture as to the maximum number of characters and/or allowable characters. A convenient set of group names can be established by using abbreviations or acronyms representing the departments to which the users belong.

This convention is followed for the system shown in FIG. 6. The two part names thus indicate that Child is in a manufacturing department, Chase is in a personnel department, and both Neff and Piaff are in marketing.

Figure 7:
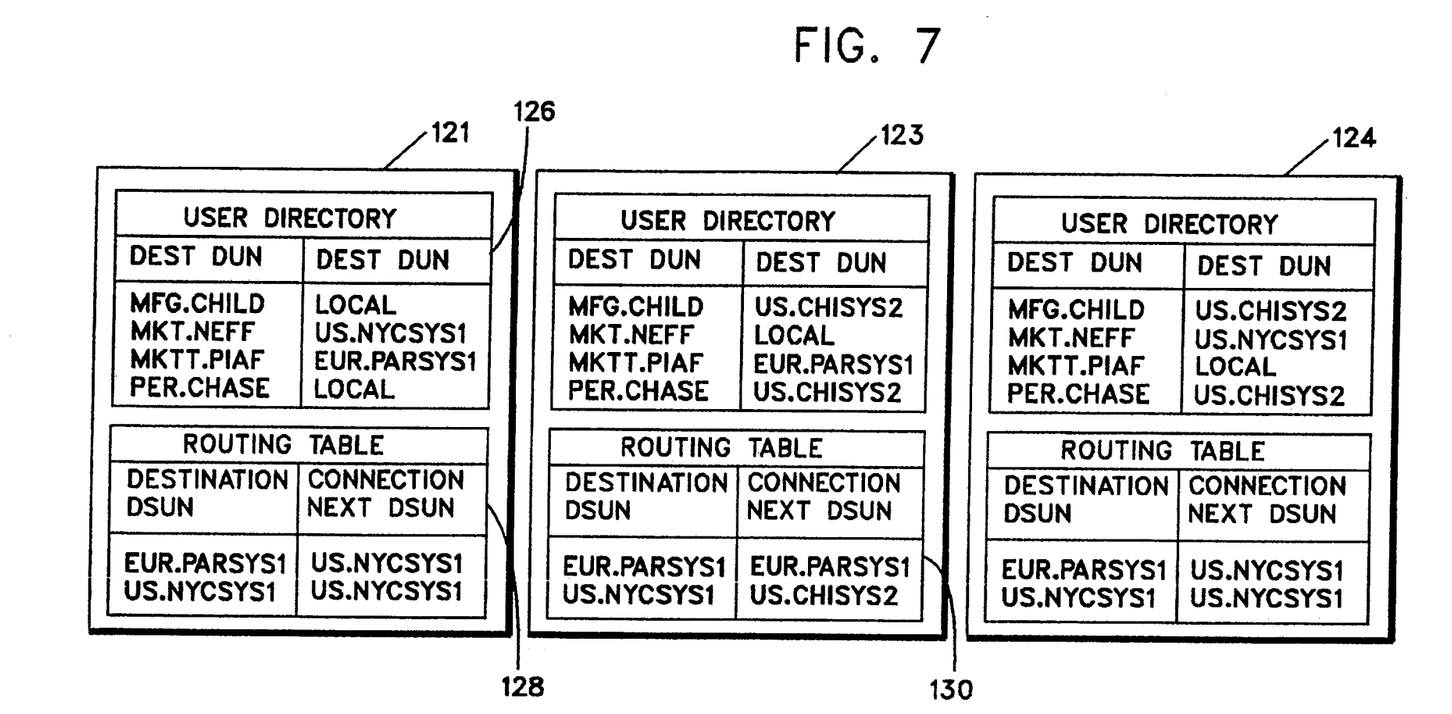
FIG. 7 represents user directories and routing tables which could exist at the nodes shown in FIG. 6.

FIG. 7 provides details of the user directories and routing tables in the data structures 120, 122 and 124. The user directory 126 in structure 120 includes the network name (DEST DUN) of each of the users and the name (DEST DSUN) of the distribution service unit for that user. As both Child and Chase are located at the distribution service unit containing user directory 126, their DEST DSUN is described only as being local. The DEST DSUN's for Neff and Piaff are explicitly identified as US.NYCSYS1 and EUR.PARSYS1, respectively.

A routing table 128 in data structure 120 identifies each non-local DSU in the network and identifies the next DSU on the path toward the destination DSU. Referring to the table and to FIG. 6, the Chicago and New York DSU's are connected directly. Therefore, the routing table in use in Chicago identifies the New York node as the next DSUN for any messages destined for New York. The Paris node, on the other hand, is connected to Chicago only through New York. Any messages originating in Chicago but destined for Paris must be routed through New York. The first entry of routing table 128 indicates this by identifying New York as the next DSU for any Chicago-origin messages destined for Paris.

When a Chicago-origin message intended for a Paris user reaches New York, a routing table 130 at the New York node is consulted to determine the next DSU to which that message should be sent. Since the New York and Paris nodes are connected directly, the routing table 130 identifies the Paris node as the next node to which a Paris-bound message passing through New York should be sent.

The simple network described above assumes that all messages can always be routed directly from an originating user to a destination user without a need for intervention anywhere along the path. That is not a realistic assumption. As noted earlier, nodes may be added to a system or may be removed as a result of merger. To deal with such situations, it is known to use an intervention list at each DSU in a network. An intervention list is a data structure which correlates certain old network addresses to new network addresses. If a message is addressed to a destination DSU which appears on the intervention list, the intervening DSU will extract the user network name from that message and will use that name to perform a directory lookup operation. If the directory shows a different destination DSU for the identified user, the message will be redirected to the D SU shown in the intervention list.

The known intervention process is satisfactory only where the only criteria for intervention is destination node name. The known intervention process cannot accommodate more complex intervention situations.

To increase intervention flexibility, a new type of intervention list is used. The new intervention list data structure is to be described with reference to FIG. 8. The figure is a tabular representation of a new intervention list such as might exist at the New York node.

Each entry in the intervention list consists of four fields, a DSU Name field 132, an Agent Name field 134, an Intervention Type field 136 and an Intervening Agent field 138. Data must be entered into each of the first three fields. The fourth field may or may not contain data. The fields, and the types of data which may be entered into each, are discussed below.

DSU Name field 132 contains the name of a destination DSU. The name of the destination DSU may be fully or partially specified. As noted earlier, each DSU in a network is uniquely identified by a two part name such as entry 140. An example of a fully specified DSU is entry 140 (US.CHISYS1). Entries 142 (CA.*) and 144(EUR.*) are examples of partially specified destination DSU's. The * character in each of these entries is a "wild card" character, which is satisfied by any node name. Thus, any incoming message addressed to any node in the CA network will, for example, result in a match in DSU Name field 132 and will trigger an intervention action.

Agent Name field 134 can include the name of a specific user or program (referred to generically as an agent) located at the DSU identified in the DSU Name field 132. The fields 132 and 134 can be viewed logically as being ANDed together. That is, for an intervention action to be triggered, an incoming message must contain both a DSU Name that satisfies the requirements of field 132 and an agent name that satisfies the requirements of field 134 for the same entry in the intervention list.

The agent name may be fully or partially specified. Entry 146 (AGENT_X) is an example of a fully specified agent name. If the agent name is fully specified, an intervention action is triggered only if there is a complete match in both fields 132 and 134 for a single list entry. For example, an intervention action is triggered by the first entry in the intervention list only if a message is directed to AGENT_X at US.CHISYS1. If the message were addressed to AGENT_Y at the same DSU, the first entry would not trigger any intervention action.

Entry 148 (*) is an example of a partially specified agent name which uses the * wild card character discussed above. A wild card character in field 134 makes it possible to trigger intervention actions for groups of agents or all agents served by a particular DSU. For example, entry 148, consisting of only a wild card character, will trigger an intervention action for any message addressed to any agent served by US.CHISYS2.

Similarly, intervention actions can be triggered for messages addressed to particular agents served by any DSU in a particular network. Entries 142 and 150 at line 5 of the intervention list would produce an intervention action for any message addressed to AGENT_B at any node in a CA network.

The type of intervention action that is triggered depends on the value of an entry into the Intervention Type field 136. Three different types of intervention action are contemplated.

Associative Redirection is used to redirect the incoming message to the network address specified in the local user directory. This type of intervention action is analogous to the currently available redirection function.

Predirecting Intervention calls for an incoming message to be sent to an intervening agent identified in field 138 before the local user directory is accessed. An intervening agent is typically an application program that operates on the contents of the message. Such a program may change the format of data in the message or may even change the destination of the message before it is passed to the local user directory.

Postdirecting Intervention requires that the message first be passed to the local user directory. After the message is processed using the local user directory, it is again checked against the intervention list. If the message still matches an entry specifying post-directing intervention, it is delivered to an intervening agent identified in the entry.

The intervening agent is an application program which falls outside the distribution service boundary discussed with reference to FIG. 3. The intervening agent can only dispose of an message it processes in one of two ways. It must either remove the message from the distribution network entirely or resubmit it to the network after processing.

Known verbs are unsuited for use in re-submitting a message after intervention since such verbs will result in the intervening agent being identified as the source of the message. The identity of the original source will be lost.

To permit original source information to be retained, a new RESUME DISTRIBUTION verb has been defined for use during a receiving sequence. To understand the RESUME DISTRIBUTION verb, it is necessary to understand the functions performed by other verbs employed to passing distributions across the boundary between an application program and the distribution services network. Other known, relevant verbs are a SEND DISTRIBUTION verb, a RECEIVE DISTRIBUTION verb and a RECEIVING SEQUENCE COMPLETED (RSC) verb.

The functions played by these verbs are described below in the context of a distribution operation. While the descriptions of the known verbs are complete enough to permit an understanding of the new RESUME DISTRIBUTION verb, more details about the known verbs are available in the *Format and Protocol Reference Manual: Distribution Services* publication referenced earlier.

Data can be transmitted from one user (the originator) to another (the destination) using the limited set of distribution services verbs listed above. Initially, an originator application program issues a SEND DISTRIBUTION verb to move the distribution across the boundary between the application program and the distribution services network. The distribution includes both the message to actually be delivered to the destination application program and control information that identifies the origin, the destination, the destination agent/user and any necessary processing parameters.

The distribution is forwarded through the network node-by-node until it reaches the DSU serving the destination application program. The DSU then notifies the destination application program that a message is waiting. To maintain the integrity of the transmission during the receiving sequence, a two-part "hand-shake" is employed.

The destination application program performs the first part of the hand-shake by issuing a RECEIVE DISTRIBUTION verb to the DSU. The DSU responds to this verb by forwarding a copy of the message to the destination application program. When the application program has successfully received and stored the message, the program issues a RECEIVING SEQUENCE COMPLETED (RSC) verb to the DSU. The RSC verb indicates to the DSU that the application program has accepted responsibility for the message. The DSU then erases its copy of the transmission.

To permit an application program to re-submit a received message to the distribution services network without losing originator information, the new RESUME DISTRIBUTION verb is defined. The RESUME DISTRIBUTION verb is similar to the known SEND DISTRIBUTION verb and may modify some of the parameters in a transmission established by the original SEND DISTRIBUTION verb. If the RESUME DISTRIBUTION verb does not explicitly modify a parameter received with the SEND DISTRIBUTION verb for the message, the original parameter is used on re-submission of the message to the network.

RESUME_DISTRIBUTION verbs are issued by an intervening application program during the course of the receiving sequence and result in one or more copies of the message, presumably modified by the application program, being returned to the distribution services network. The application program will not issue the RSC verb until all RESUME DISTRIBUTION verbs have been issued and acted upon.

Figure 9A:
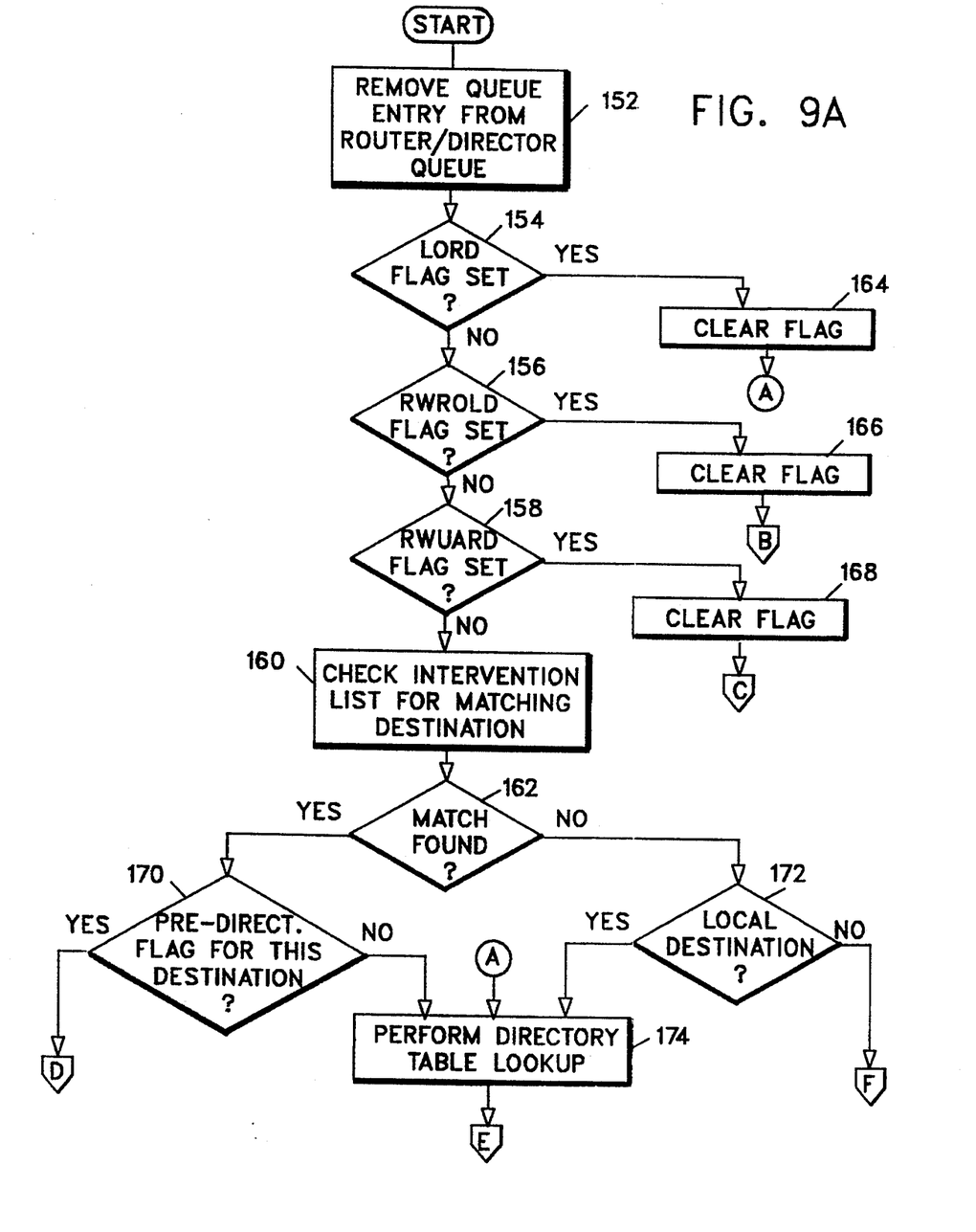
Figure 9B:
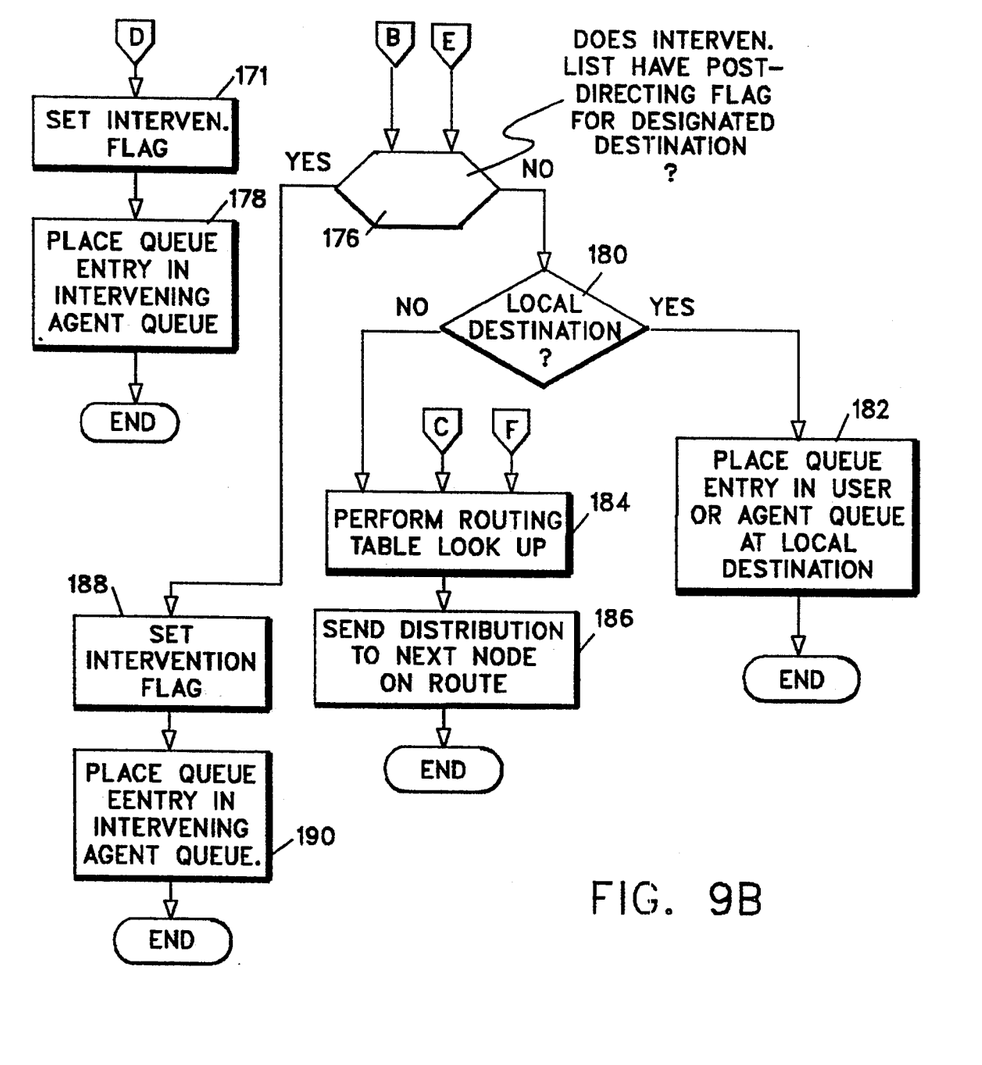

FIG. 9, consisting of FIGS. 9A and 9B, is a flowchart of logic employed in using the intervention list described above. In a first step 52, a queue entry for a received message is removed from a router/director queue in the DSU. A check 154 is then made to see if a LORD (Local Origin-Requiring Directing) flag is set in the entry. A set LORD flag indicates the distribution originated locally and has not yet been directed using the local user directory.

If the LORD flag is found to be set, it is cleared in an operation 164 and a directory table lookup is performed (operation 174) to identify the destination DSU serving the destination user named in the distribution.

If the LORD flag is initially reset, however, another check 156 is made to see if a RWROLD (Resubmission With Redirected or Local Destination) flag is set for the message. A set RWROLD flag indicates the message originated elsewhere, has been intercepted and processed locally by an intervening agent, and is being resubmitted to the distribution services network for forwarding.

If the RWROLD flag is set, it is cleared in an operation 166 and the program branches to an operation 176, which checks to see if the intervention list has a post-directing flag or entry for the destination designated in the resubmitted message. The program responses to operation 176 are discussed later.

If the RWROLD flag is initially found to be clear or reset by operation 156, still another check 158 must be made to see if a RWUARD (Resubmission With Unmodified And Remote Destination) flag is set. A set RWUARD flag indicates the distribution originated elsewhere, was intercepted and processed locally and is being resubmitted to the distribution services network without change in the originally-identified, remote destination.

If check 158 shows the RWUARD flag is set, it is cleared in an operation 168 and the queue entry is forwarded to the routing function to permit a routing table lookup to be performed in an operation 184. Operation 184 is described in more detail later.

If check 158 shows the RWUARD flag is initially clear, the destination information contained in the queue entry is checked against the destination fields in the local intervention list in an operation represented by blocks 160 and 162. If no match is found, a further check 172 is made to see whether the specified destination is a local one. If it is, the queue entry is passed to the directing function to permit a directory table lookup in operation 174. If the destination is not local, it must be remote. Program control branches to the routing table lookup operation 184. Operation 184 retrieves the identity of the next DSU on the path to the ultimate destination. Once the next DSU is identified, the distribution identified by the queue entry is forwarded to that DSU in an operation 186.

If operation 162 shows that the destination information for the queue entry matches destination fields for one of the entries in the intervention list, a check 170 is made to see if the intervention list contains a predirecting intervention entry for the matched destination. If predirecting intervention is indicated by check 170, an intervention flag is set in the queue entry, which is placed in a queue for the intervening agent specified in the intervention list.

While the intervening agent will generally cause the distribution to be resubmitted to the network later, the current cycle of the intervention process is considered to have terminated after operation 178. If the distribution is resubmitted after processing by the intervening agent, a new cycle of the intervention process begins.

If check 170 did not reveal a predirecting intervention entry for a matched destination, operation 174 is performed to identify the destination DSU serving the user identified in the message. Once the destination DSU is identified in operation 174, that destination must be checked against the intervention list to determine whether a post-directing intervention flag has been assigned to the destination.

If a post-directing intervention flag is found in operation 176, an intervention flag is set in operation 188 to indicate intervention is occurring. The distribution or queue entry is then placed in a queue for the specified intervening agent in operation 190. The completion of step 190 ends the intervention cycle. Intervening agent 190 may, and probably will, cause the distribution to resubmitted to the network. If that happens, a new intervention cycle is initiated to handle the re-submission.

If operation 176 shows there is no post-directing intervention flag for the designated destination, a check 180 is then made to determine whether the designated destination is a local one; that is, one served by the distribution service unit in which the intervention process is being performed. If the destination is local, the queue entry is placed in the local user or agent queue in an operation 182 and the intervention cycle is considered complete.

If operation 180 shows that the destination is remote, rather than local, the routing table must be accessed in operation 184 to identify the next DSU on the path to the ultimate destination. As discussed earlier, the routing table lookup is followed by sending the distribution to the next DSU node on the route. The intervention cycle is considered to be completed when the distribution is forwarded to the next node.

The enhanced intervention mechanism described above has a number of advantages over the only known intervention mechanism, which intervenes solely on the basis of destination node name. The enhanced mechanism permits distributions to be selectively intercepted on the basis of destination node name and/or agent name. It also permits distributions to be delivered to intervening agents before or after accessing a local user directory. It further permits distributions to processed local by intervening agents and then re-submitted to the distribution services network using the RESUME DISTRIBUTION verb without losing source identifying information.

While there has been described a preferred embodiment of the present invention, variations and modifications in that embodiment may occur to those skilled in the art once they learn of the basic inventive concepts. Therefore, it is intended that the appended claims shall be construed to include both the preferred embodiment and all such variations and modifications as fall within the true spirit and scope of the invention.

We claim:

1. For use in a data communication network comprising a plurality of nodes, one or more of which provide distribution services (DS) to users to enable an originating user to distribute a message to a destination user, each DS-providing node containing a user directory, said user directory having one or more entries identifying users and the nodes which provide distribution services to those users, and a routing table, said routing table having one or more entries each identifying another DS node and the next DS node on a route to the identified node, message intercepting system in at least one of the DS-providing nodes for selectively intercepting messages, said message intercepting system comprising:

an intervention list data structure having one or more entries, each said entry providing at least a partial identification of a destination DS node, at least a partial identification of one or more users, and an intervention type;

means for receiving incoming messages and for comparing destination DS node information and user information in said incoming messages to intervention list entries; and means responsive to a match to process incoming message as a function of the contents of the associated intervention type field.

2. A system as defined in claim 1 further including means responsive to a particular intervention information value to forward a message to an intervening application program, to accept the message after it is processed by the intervening application program and to forward the processed message to a local user directory.

3. A system as defined in claim 2 further including means for resubmitting a message to the network after that message is processed by an intervening application program, said resubmitted message containing original information as to its origin.

4. For use in a data communication network including a plurality of nodes which provide data processing services to attached users, one of those services being the distribution of messages from one user to another, a method of selectively intervening in the distribution of messages, said method being performed in at least one of the nodes and comprising the steps of:

extracting information from an incoming message identifying the intended destination of the message;

comparing the extracted destination information to destination information contained in an intervention list stored at the node, said intervention list having one or more entries, each entry containing destination fields, an intervention type field and an intervening agent field;

if a match is found between the extracted destination information and the destination information stored in an intervention list entry, retrieving the intervention type for the same entry; and directing the message to a local user directory if the intervention type has a first value or to an intervening application program running at the node if the intervention type has a second value.

5. A method as defined in claim 4 further including the steps of accepting a message after it is acted upon by the intervening application program, extracting and comparing the message destination information to stored destination information, retrieving an intervention type associated with the matched destination, and forwarding the message to the local user directory if the intervention type field has a predetermined value.

* * * * *